United States Patent Office 3,206,494
Patented Sept. 14, 1965

3,206,494
CYCLIC PHOSPHONITRILES AND PROCESS FOR PREPARING SAME
Lars Gunnar Lund, Tampere, Finland, and Peter Arthur Dye, Wombourn, England, assignors to Albright & Wilson (Mfg.) Limited, Oldbury, near Birmingham, England
No Drawing. Filed Nov. 19, 1962, Ser. No. 238,744
Claims priority, application Great Britain, Nov. 23, 1961, 41,994/61
16 Claims. (Cl. 260—461)

This invention relates to novel cyclic phosphonitrilic compounds, and to their preparation.

Many phosphonitrilic chlorides of the formula $(PNCl_2)_n$ where $n$ is an integer of from 3 to 17 are known. These compounds are cyclic compounds containing the repeating unit

and among the most readily available are the trimer, $(PNCl_2)_3$, and the tetramer, $(PNCl_2)_4$. A mixture of the cyclic phosphonitrilic chlorides is obtained when phosphorus pentachloride is reacted with ammonium chloride in a chlorinated inert solvent, such as s-tetrachloroethane, and the liquid phosphonitrilic chlorides produced at the same time removed by extracting the cyclic compounds with a hydrocarbon solvent; the cyclic phosphonitrilic chlorides may then be separated from each other by fractional distillation and fractional crystallisation techniques. The cyclic phosphonitrilic bromides may be made in similar manner and the cyclic phosphonitrilic fluorides may be made from the chlorides by reaction with certain inorganic fluorides.

These cyclic phosphonitrilic chlorides must be distinguished from the linear phosphonitrilic chlorides, which are of the general formula $(PNCl_2)_n \cdot PCl_5$. These linear compounds have the structure

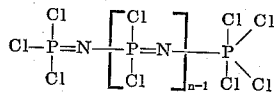

and although they also contain the repeating

unit the linear compounds are ionic in character and are insoluble in non-polar solvents such as petroleum, in which the cyclic phosphonitrilic chlorides are readily soluble. This ionic character of the linear phosphonitrilic chlorides causes them to be quite different in their chemical properties from the cyclic compounds and, although the linear and cyclic halides are often produced together, they are usually separated by extraction with petroleum or other non-polar solvent before use. The present invention is not concerned with the linear phosphonitrilic compounds, but only with phosphonitrilic compounds of cyclic structure.

The cyclic phosphonitrilic chlorides are reported to react readily with phenols and aroxides to produce phosphonitrilic esters of the formula $[PN(OR)_2]_n$ where $n$ is an integer of from 3 to 17 and R is an aryl group. These aryl ester in contrast to the corresponding alkyl esters have a marked hydrolytic stability. It is further known that phosphonitrilic chlorides may be aminated by the action of ammonia or primary amines $(R'NH_2)$ though it is difficult to replace all the chlorine atoms of the phosphonitrilic compounds by $-NH_2$ or $-NHR'$ groups.

It has now been found that certain cyclic phosphonitrilic compounds, herein referred to as phosphonitrilamidates, which have hitherto been unknown can be prepared and are of particular utility in the production of polyurethane materials having flame-retardant properties. Such polyurethane materials constitute the invention of copending application No. 238,755, filed November 19, 1962.

The novel phosphonitrilamidates of the present invention are cyclic compounds of the overall general formula $[PN(OR)_x(NHR')_y]_n$, wherein each R is an aryl group, each R' is a hydrogen atom or an alkyl or aryl group, $x$ and $y$ are positive numbers which may be fractional, such $x+y=2$, and $n$ is an integer of from 3 to 17.

The present invention also provides a novel process for producing cyclic phosphonitrilic halidates of the overall general formula $[PN(OR)_xX_y]_n$, wherein each X is a fluorine, chlorine or bromine atom and R, $x$, $y$ and $n$ are each as defined above, which compounds may be produced as intermediates in the preparation of the novel phosphonitrilamidates. Moreover, these partial esters also find use as intermediates in the production of other useful phosphonitrilic derivatives.

The novel phosphonitrilamidates may be prepared by one of two general processes. Thus, a cyclic phosphonitrilic halide of the general formula $[PNX_2]_n$, wherein each X is a chlorine, bromine or fluorine atom and $n$ is an integer of from 3 to 17 (preferably each X is a chlorine atom and $n$ is 3 or 4), is successively reacted *in either order* with: (1) one or more metal aroxides; and (2) ammonia or a primary aliphatic or aromatic amine, the reactions being carried out in the presence of an inert liquid diluent, and the first of the two stages being carried out with such an amount of the aroxide, ammonia or amine as the case may be or under such conditions that reaction does not occur with all the halogen atoms in the phosphonitrilic halide.

Thus, the preparation of the phosphonitrilamidates involves the successive reactions carried out in either order of partial esterification and amination of the halogen atoms in the phosphonitrilic halidates of the general formula $[PN(Or)_xX_y]_n$ or cyclic phosphonitrilic amidohalides of the general formula $[PN(NHR')_yX_x]_n$, wherein each R, R', X, $x$, $y$ and $n$ have the significance given previously. The route involving production of the phosphonitrilic halidates is preferred.

The phosphonitrilic amidohalides have been previously described by N. L. Paddock and H. T. Searle in "Advances in Inorganic Chemistry and Radio-chemistry," vol. I (1959), page 360.

The two reactions of esterification and amination can be carried out, if desired, successively without isolation of the intermediate product, though it is desirable to remove from the reaction mixture at least the by-product metal, ammonium or amine salt. Each of the reactions is desirably carried out in a liquid diluent which is a solvent for the phosphonitrilic reactant and product but a non-solvent for the metal, ammonium or amine salt formed therewith so that this can be removed by filtration. Suitable diluents of this type are liquid hydrocarbons and chlorinated hydrocarbons such as benzene, toluene, petroleum ethers, methylene chloride, chloroform and carbon tetrachloride.

The esterification of the halide atoms either in the phosphonitrilic halides or in the phosphonitrilic amidohalides is carried out in an inert liquid diluent, such as benzene, toluene, acetone, chloroform or petroleum ethers, in which is dissolved or dispersed a metal aroxide. Suitable aroxides for use in the processes of the present invention are, for instance, the sodium, potassium, lithium, magnesium and aluminum phenate salts of such phenols and halogenated phenols as phenol, cresols, xylenols and naphthols and chlorinated phenol, cresols and xylenols. The preferred compounds for present use are the aroxides derived from an alkali metal and a mononuclear phenol containing only alkyl and/or chlorine substituents, since the resulting phosphonitrilamidates are then more suitable for use in the production of polyurethane materils. However, the use of naphthols can provide partial naphthate esters which find use for other purposes. Particularly valuable for such purposes are the cyclic phosphonitritic halidate trimers having two halogen atoms per molecule, that is in the general formula $y$ is 0.67 and $n$ is 3. The esterification reaction may be carried out by heating the reactants together for a short time whereupon the formed metal halide is normally precipitated from the liquid diluent; this is then filtered off and the esterified product recovered, if desired, by removal of the diluent. Alternatively, the reaction mixture may be diluted with water and the phosphonitrilic derivative extracted into an organic solvent, such as a hydrocarbon, the metal halide remaining in the aqueous phase. If desired, esterification may be carried out with a mixture of aroxides and in such instances the phosphonitrilic reactant may, if desired, be reacted first with one aroxide and then with a second aroxide to provide a mixed phosphonitrilic halidate or phosphonitrilamidate as appropriate.

We have further found that improved yields of the cyclic phosphonitrilic halidates of the general formula $[PN(OR)_xX_y]_n$, wherein R, $x$, $y$ and $n$ are each as hereinbefore defined, can be obtained by the use of particular modifications of the general reaction previously described. In these modifications the inert diluent consists of or comprises an aliphatic ketone, preferably acetone, and during the reaction with the metal phenate the temperature of the reaction mixture is maintained between $-20°$ C. and $+20°$ C. until the phenate and phosphonitrilic halide have been completely intermixed. This requires slow addition and external cooling of the mixture as the esterification reaction is highly exothermic. In the case of the preparation of the naphthate esters it is preferred that the temperature of the reaction mixture be maintained between 0 and 10° C. After complete intermixing of the reactants the temperature of the reaction mixture may be allowed to rise without disadvantage and the reaction is then usually taken to completion by refluxing the reaction mixture for a few hours. To obtain the advantages of this modification the diluent must consist of or comprise an aliphatic ketone. Preferably the diluent is acetone but this may be diluted with aromatic hydrocarbons such as toluene provided the diluent comprises at least 20% by volume of the ketone.

Improved results from this modified technique are also obtained if the phenate salt is prepared in situ in the diluent, that is the phosphonitrilic halide and free phenol are mixed in the ketone-containing diluent and to this mixture an alkali, such as sodium hydroxide, is slowly added either as a solid or as an aqueous solution, care being taken to maintain the temperature within the desired limits.

With these modifications the phosphonitrilic halidate product may be isolated by pouring the reaction mixture into water to dissolve the formed metal chloride and extracting the desired product into an organic solvent, such as diethyl ether or an aromatic hydrocarbon. If an aromatic hydrocarbon is employed in admixture with the aliphatic ketone then on pouring into water the phosphonitrilic product will be retained in the organic layer. The phosphonitrilic halidate can then be purified by suitable washing and drying of the solution followed by removal of the solvent by distillation, preferably under vacuum.

Not only do these improvements in the general processes for the preparation of these cyclic phosphonitrilic partial aryl esters provide the advantage of an improved yield of product, but the product is also obtained in a greater degree of purity; in some instances the products have even been obtained in crystalline form as distinct from the usual slightly discoloured viscous liquids.

The amination of the halide atoms either in the phosphonitrilic halides or in the phosphonitrilic halidates is carried out by treating the phosphonitrilic compound with ammonia or a primary aliphatic or aromatic amine in the presence of an inert liquid diluent. If desired, mixtures of ammonia and/or amines may be employed in similar manner as when a mixed esterification reaction is carried out. The preferred diluents are chloroform, methylene chloride, carbon tetrachloride, benzene or hexane. If necessary, the reaction mixture may be heated or cooled and the amination reaction is normally carried out within the range 0–150° C. It is often desirable to carry out the amination reaction under substantially anhydrous conditions but, provided the aroxy groups in the phosphonitrilic chloridates are water-stable, an aqueous ammoniacal solution may be used. In other instances the solution of the phosphonitrilic compound is treated with the anhydrous amine or with gaseous ammonia. After reaction with the ammonia or amine is complete, the formed ammonium chloride or amine hydrochloride is separated, normally by filtration and the diluent removed, preferably by distillation under reduced pressure, to isolate the aminated material. As suitable amines for use in the present invention there may be mentioned methylamine, ethylamine, cyclohexylamine and aniline, though the use of ammonia is preferred when the phosphonitrilamidate is to be used in the production of a plyurethane material.

The novel phosphonitrilamidates are normally coloured viscous liquids though in some instances they may be solids. They may not be distilled without decomposition, but may usually be purified by fractional crystallisation from a suitable solvent, for example benzene, hexane, or chloroform.

This invention will now be illustrated by the following examples:

Example 1

A cyclic phosphonitrilic chloridate of formula

$$[PN(OC_6H_5)Cl]_3$$

was prepared by reacting cyclic phosphonitrilic chloride trimer in solution in chloroform with the appropriate quantity of sodium phenate. The precipitated sodium chloride was removed by filtration and the solvent removed by distillation under reduced pressure to leave a viscous residue of the phosphonitrilic chloridate trimer.

This phosphonitrilic chloridate (205 g.) was dissolved in chloroform (500 ml.) and gaseous ammonia passed through the solution at room temperature until reaction was complete. The precipitated ammonium chloride was then filtered off and the solvent removed by distillation under reduced pressure. There was obtained as a pale grey/brown product a phosphonitrilamidate having the analysis C, 47.6; H, 3.7; P, 18.3%; the compound corresponding to the formula $[PN(OC_6H_5)(NH_2)]_3$ requires C, 46.8; H, 4.6; P, 20.0%.

The above product was subsequently used in the production of a flexible polyurethane foam which was shown to be inherently flame-retardant.

Example 2

The procedure of Example 1 was repeated using 30 g. of the phosphonitrilic chloride trimer (30 g.), the sodium phenate being replaced by sodium p-chlorphenate (40 g.). The resulting phosphonitrilic chloridate trimer approximated to the formula $[PN(OC_6H_4Cl)Cl]_3$.

The above chloridate (43 grams) was treated with gaseous ammonia as in Example 1 to provide a cyclic phosphonitrilamidate trimer (33 g.) approximating to the formula $[PN(OC_6H_4Cl)(NH_2)]_3$.

The phosphonitrilamidate was subsequently employed in the production of a flame-retardant flexible polyurethane foam.

Example 3

The procedure of Example 1 was repeated except that the sodium phenate was replaced by sodium pentachlorophenate to produce a cyclic phosphonitrilic chloridate trimer approximating to the formula $[PN(OC_6Cl_5)Cl]_3$. This compound was converted into the cyclic phosphonitrilamidate, $[PN(OC_6Cl_5)(NH_2)]_3$, by the method described in Example 1. The phosphonitrilamidate was subsequently employed in the production of a flexible polyurethane foam having flame-retardent properties.

Example 4

Phosphonitrilic chloride trimer (46 g.) was reacted with sodium p-chlorophenate (40 g.) in chloroform to produce a phosphonitrilic chloridate of the approximate formula $[PN(OC_6H_4Cl)_xCl_y]_3$ where $x=0.67$ and $y=1.33$. This compound was not isolated from solution and sodium pentachlorophenate (62 g.) was then added to the reaction mixture. Gaseous ammonia was thereafter passed into the reaction mixture for 2 hours, the precipitated sodium and ammonium chlorides filtered off and the solvent then removed by distillation under reduced pressure to produce a phosphonitrilamidate approximating to the formula $[PN(OC_6H_4Cl)_p(OC_6Cl_5)_q(NH_2)_y]_3$ where $p$, $q$ and $y$ are each approximately 0.67.

This phosphonitrilamidate was subsequently reacted with a polypropylene glycol of approximate molecular weight 3000, toluene di-isocyanate and water to produce a polyurethane foam which was tough and resilient though coarse in texture and was inherently flame-retardant.

Example 5

Phosphonitrilic chloride trimer (350 g.) was dissolved in acetone (1.5 litres) and sodium phenate (580 g. of 83% active content) added slowly with continuous stirring keeping the temperature below 25° C. during the addition. Thereafter the reaction mixture was refluxed for 4 hours, cooled and the precipitated sodium chloride removed by filtration. The crude product was purified by dissolving in ether and washing this solution successively with diluted sodium hydroxide solution and water, drying the ethereal solution with anhydrous sodium sulphate, filtering and removing the ether under vacuum. The phosphonitrilic chloridate of the formula

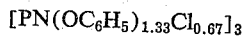
$$[PN(OC_6H_5)_{1.33}Cl_{0.67}]_3$$

was obtained as a slightly discoloured white oil (437 g., yield 76%) having the analysis: C, 49.2; H, 3.8; N, 7.20; P, 15.2; Cl, 12.5. $P_3N_3(OC_6H_5)_4Cl_2$ requires C, 49.8; H, 3.5; N, 7.26; P, 16.1; Cl, 12.3%. After standing for one week some crystals separated from the oil. After removal by filtration, washing with a little cold hexane and drying, the crystals (60 g.) had a melting point of 72.5° C. and analysed: C, 50.0; H, 3.8; N, 7.36; P, 16.1; Cl, 12.3%.

Example 6

Phosphonitrilic chloride trimer (50 g.) and phenol (57 g.) were dissolved in acetone (200 ml.). A solution of sodium hydroxide (30 g.) in water (100 ml.) was added slowly to the acetone solution keeping the temperature below 15° C. throughout the addition. The mixture was then refluxed for 1 hour, cooled and poured into water (250 ml.). There separated a white oil which was purified as in Example 5 to provide the phosphonitrilic chloridate as a colourless oil (67.5 g., yield 81%) having the analysis: C, 49.2; H, 3.8; N, 7.28; P, 15.2; Cl, 12.5%. After standing for a few weeks crystals separated from the oil and then were shown to be of the formula

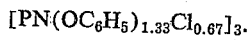
$$[PN(OC_6H_5)_{1.33}Cl_{0.67}]_3.$$

Example 7

Phosphonitrilic chloride trimer (52 g.) was dissolved in a 4:1 mixture of toluene and acetone (360 ml.) and to the solution there was slowly added sodium β-naphthate (150 g.) keeping the temperature below 10° C. After allowing the solution to warm up slowly to room temperature, the mixture was refluxed for 7 hours, cooled and the precipitated sodium chloride removed by filtration. The solvent was then removed from the reaction mixture by distillation under reduced pressure and the residual oil purified as in Example 5. There was obtained the phosphonitrilic chloridate of the formula

$$[PN(\beta\text{-}OC_{10}H_7)_{1.33}Cl_{0.67}]_3$$

as a light brown viscous liquid in 76% yield which analysed: C, 61.0; H, 4.0; N, 5.7; P, 12.1; Cl, 9.1.

$$P_3N_3(OC_{10}H_7)_4Cl_2$$

requires: C, 62.0; H, 3.7; N, 5.4; P, 12.0; Cl, 9.1%.

Example 8

Phosphonitrilic chloride trimer (35 g.) and β-naphthol (57.6 g.) were dissolved in a 3:1 mixture of toluene and acetone (350 ml.). The solution was cooled to −10° C. and an aqueous solution of sodium hydroxide (20.8 g.) slowly added. The reaction mixture was then allowed to warm to room temperature, refluxed for 3½ hours, and then poured into distilled water. The toluene layer was separated, washed five times with water, dried over anhydrous sodium sulphate and the toluene then removed by distillation to provide an 82% yield of the phosphonitrilic chloridate of the formula

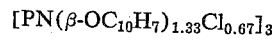
$$[PN(\beta\text{-}OC_{10}H_7)_{1.33}Cl_{0.67}]_3$$

which had an analysis closely similar to the product of Example 7.

Example 9

The process of Example 8 was repeated using α-naphthol in place of the β-naphthol. There was obtained as a red-brown semi-solid an 82% yield of the phosphonitrilic chloridate of the formula

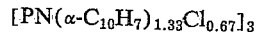
$$[PN(\alpha\text{-}C_{10}H_7)_{1.33}Cl_{0.67}]_3$$

having the analysis: C, 61.0; H, 3.88; N, 5.55; P, 11.0; Cl, 8.7. $P_3N_3(OC_{10}H_7)_4Cl_2$ requires C, 62.0; H, 3.7; 5.4; P, 12.0; Cl. 9.1%.

What we claim is:

1. A cyclic phosphonitrilamidate of the formula

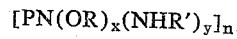
$$[PN(OR)_x(NHR')_y]_n$$

wherein each R is selected from the group consisting of monocyclic aryl and naphthyl, each R' is selected from the group consisting of hydrogen, lower alkyl and phenyl, $x$ and $y$ are positive numbers such that $x+y=2$, and $n$ is an integer of from 3 to 17.

2. A cyclic phosphonitrilamidate of the formula

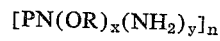
$$[PN(OR)_x(NH_2)_y]_n$$

wherein each R is a monocyclic aryl, $y$ has a value between 0.6 and 1.1, $x$ has a value such that $x+y=2$, and $n$ is an integer of from 3 to 4.

3. A cyclic phosphonitrilamidate of the formula

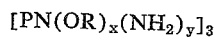
$$[PN(OR)_x(NH_2)_y]_3$$

wherein R is phenyl and $x$ and $y$ each have a value between 0.9 and 1.1 such that $x+y=2$.

4. A cyclic phosphonitrilamidate of the formula

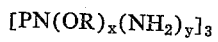
$$[PN(OR)_x(NH_2)_y]_3$$

wherein R is a chlorinated phenyl, and $x$ and $y$ each have a value between 0.9 and 1.1 such that $x+y=2$.

5. The cyclic phosphonitrilamidate having the formula 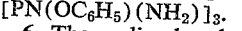 $[PN(OC_6H_5)(NH_2)]_3$.

6. The cyclic phosphonitrilamidate having the formula $[PN(OC_6H_4Cl)(NH_2)]_3$.

7. The cyclic phosphonitrilamidate having the formula 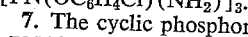 $[PN(OC_6Cl_5)(NH_2)]_3$.

8. The cyclic phosphonitrilamidate having the formula 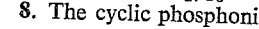

[PN(OC$_6$H$_4$Cl)$_p$(OC$_6$Cl$_5$)$_q$(NH$_2$)$_y$]$_3$, wherein $p$, $q$, and $y$ are each about 0.67.

9. A process for the preparation of a cyclic phosphonitrilamidate of the formula [PN(OR)$_x$(NHR')$_y$]$_n$, wherein each R is selected from the group consisting of monocyclic aryl and naphthyl, each R' is selected from the group consisting of hydrogen, lower alkyl and phenyl, $x$ and $y$ are positive numbers such that $x+y=2$ and $n$ is an integer of from 3 to 17, which comprises reacting in separate stages in the presence of an inert liquid diluent a cyclic phosphenitrilic halide of the general formula (PNX$_2$)$_n$, wherein each X is selected from the group consisting of fluorine, chlorine and bromine atoms and $n$ is as above, with at least one metal aroxide and with an aminating agent selected from the group consisting of ammonia and primary aliphatic and aromatic amines, the first of the two stages being carried out with such an amount of reactant and under such conditions whereby reaction does not occur with all the said halogen atoms in the phosphonitrilic halide during the reaction in the first stage.

10. A process as claimed in claim 9, in which each R is a monocyclic aryl, $y$ has a value between 0.6 and 1.1, $x$ has a value such that $x+y=2$ and $n$ is an integer of from 3 to 4 and which comprises successively reacting in the presence of an inert liquid diluent a cyclic phosphonitrilic halide of the general formula (PNCl$_2$)$_n$, wherein $n$ is an integer of from 3 to 4, with: (1) an alkali-metal aroxide derived from a phenol (ROH) in an amount to provide a value of $x$ in the said general formula of from 0.9 to 1.4; and (2) with ammonia.

11. A process as claimed in claim 9, in which the said aliphatic ketone is acetone and in which the said aroxide is prepared in situ by the addition of an alkali to the mixture of phosphonitrilic halide, phenol and diluent while maintaining the temperature of the reaction mixture between $-20°$ C. and $+20°$ C. throughout the addition.

12. A process for the preparation of a cyclic phosphonitrilic chloridate of the formula [PN(OR)$_x$Cl$_y$]$_3$, wherein each R is a monocyclic aryl, $y$ has a value between 0.6 and 1.1 and $x$ has a value such that $x+y=2$, which comprises intermixing and reacting cyclic phosphonitrilic chloride trimer, (PNCl$_2$)$_3$, with at least one alkali-metal aroxide derived from a phenol ROH in an inert diluent comprising at least 20% by volume of acetone, the reaction mixture being maintained between $0°$ C. and $20°$ C. until the said intermixing is complete.

13. A process as claimed in claim 12, in which the said aroxide is prepared in situ by the addition of an alkali to the mixture of phosphonitrilic chloride, phenol and diluent while maintaining the temperature of the reaction mixture within the said limits throughout the addition.

14. A process for the preparation of a cyclic phosphonitrilic halidate of the formula [PN(OR)$_x$X$_y$]$_n$, wherein each R is selected from the group consisting of phenyl and naphthyl, each X is selected from the group consisting of fluorine, chlorine and bromine atoms, $x$ and $y$ are positive numbers such that $x+y=2$, and $n$ is an integer of from 3 to 17, which comprises reacting in an inert liquid diluent selected from the group consisting of aliphatic ketones, and mixtures of aromatic hydrocarbons and aliphatic ketones, said ketones being at least 20% by volume of said mixture, a cyclic phosphonitrilic halide of the general formula (PNX$_2$)$_n$, wherein X and $n$ are as defined above, with at least one metal aroxide derived from a phenol ROH, maintaining the temperature of the reaction mixture between $-20°$ C. and $+20°$ C. until the phosphonitrilic halide and the aroxide have been completely intermixed, and thereafter separating the phosphonitrilic product from the metal halide formed therewith.

15. A process for the preparation of a cyclic phosphonitrilic chloridate of the formula [PN(OR)$_x$Cl$_y$]$_3$, wherein R is a naphthyl, $y$ has a value between 0.6 and 1.1 and $x$ has a value such that $x+y=2$, which comprises intermixing and reacting cyclic phosphonitrilic chloride trimer, (PNCl$_2$)$_3$, with at least one alkali-metal aroxide derived from a naphthol ROH in an inert diluent comprising at least 20% by volume of acetone, the reaction mixture being maintained between $0°$ and $10°$ C. until the said intermixing is complete.

16. A process as claimed in claim 15, in which the said aroxide is prepared in situ by the addition of an alkali to the mixture of phosphonitrilic chloride, phenol and diluent while maintaining the temperature of the reaction mixture within the said limits throughout the addition.

References Cited by the Examiner

UNITED STATES PATENTS

| | | | |
|---|---|---|---|
| 2,109,491 | 3/38 | Lipkin | 260—461 X |
| 2,192,921 | 3/40 | Lipkin | 260—461 |
| 2,214,769 | 9/40 | Lipkin | 260—461 X |
| 2,751,384 | 6/56 | Coover et al. | 260—461 X |

CHARLES B. PARKER, *Primary Examiner.*

IRVING MARCUS, *Examiner.*